(12) United States Patent
Lenz

(10) Patent No.: US 9,791,882 B2
(45) Date of Patent: Oct. 17, 2017

(54) VOLTAGE SOURCE

(71) Applicant: STMicroelectronics (Alps) SAS, Grenoble (FR)

(72) Inventor: Kuno Lenz, Voreppe (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 0 days.

(21) Appl. No.: 15/019,619

(22) Filed: Feb. 9, 2016

(65) Prior Publication Data

US 2017/0038788 A1  Feb. 9, 2017

(30) Foreign Application Priority Data

Aug. 7, 2015  (FR) ...................... 15 57600

(51) Int. Cl.
  *H03K 17/16* (2006.01)
  *G05F 3/26* (2006.01)
  *G05F 1/46* (2006.01)
  *H02J 7/34* (2006.01)

(52) U.S. Cl.
  CPC ............... *G05F 3/262* (2013.01); *G05F 1/46* (2013.01); *G05F 3/265* (2013.01); *H02J 7/34* (2013.01)

(58) Field of Classification Search
  CPC ........................... H03K 17/16; H03K 17/165
  USPC ........................................ 327/379–384, 390
  See application file for complete search history.

(56) References Cited

U.S. PATENT DOCUMENTS

| | | | | |
|---|---|---|---|---|
| 5,612,582 A * | 3/1997 | Shichi | ............... | H03K 17/04206 307/125 |
| 5,973,513 A * | 10/1999 | Koch | ............... | H01L 27/082 257/E27.053 |
| 6,088,206 A * | 7/2000 | Chan | ............... | H03K 17/166 326/27 |
| 6,313,819 B1 * | 11/2001 | Maekawa | ............... | G09G 3/2011 345/100 |
| 7,245,165 B2 * | 7/2007 | De Langen | ............... | H03F 1/02 326/83 |
| 7,402,869 B2 * | 7/2008 | Peterson | ............... | H03K 17/04123 257/360 |
| 7,479,770 B2 * | 1/2009 | Kohout | ............... | H03K 17/166 323/271 |
| 7,489,166 B2 * | 2/2009 | Honda | ............... | H03K 17/166 326/82 |
| 7,660,094 B2 * | 2/2010 | Urakabe | ............... | H02M 1/38 361/111 |
| 7,786,713 B2 * | 8/2010 | Kimura | ............... | G05F 1/56 323/269 |
| 8,222,846 B2 * | 7/2012 | Sugie | ............... | H02P 6/085 318/379 |
| 8,593,773 B2 * | 11/2013 | Heckmann | ............... | H03K 17/0822 361/93.1 |

(Continued)

FOREIGN PATENT DOCUMENTS

| | | |
|---|---|---|
| CN | 101753000 A | 6/2010 |
| CN | 104638994 A | 5/2015 |
| EP | 1 349 255 A2 | 10/2003 |

*Primary Examiner* — Thomas J Hiltunen
(74) *Attorney, Agent, or Firm* — Seed IP Law Group LLP

(57) ABSTRACT

A voltage source wherein at least one first switch couples a first node of the voltage source to a node of application of at least one potential of a power supply voltage, and at least one first capacitive element couples the first node or a second node of the voltage source to a control node of the first switch.

19 Claims, 3 Drawing Sheets

(56) References Cited

U.S. PATENT DOCUMENTS

| | | | |
|---|---|---|---|
| 8,598,919 B2* | 12/2013 | Koyasu | G05F 3/267 |
| | | | 327/109 |
| 8,885,308 B2* | 11/2014 | Waltman | H02H 3/24 |
| | | | 361/90 |
| 2010/0295524 A1* | 11/2010 | Sicard | G05F 1/56 |
| | | | 323/282 |
| 2011/0260772 A1 | 10/2011 | Sicard | |
| 2013/0033247 A1* | 2/2013 | Endo | G05F 1/575 |
| | | | 323/282 |
| 2015/0171855 A1* | 6/2015 | Braun | H03K 17/162 |
| | | | 327/384 |
| 2016/0124040 A1* | 5/2016 | Bakran | G01R 31/27 |
| | | | 324/415 |
| 2016/0254810 A1* | 9/2016 | Rossberg | H03K 17/04206 |
| | | | 327/109 |

* cited by examiner

VOLTAGE SOURCE

BACKGROUND

Technical Field

The present disclosure generally relates to electronic circuits and, more specifically, to a voltage source.

Description of the Related Art

In certain applications, there is a need for a floating source, that is, a source maintaining a voltage between two output nodes having potentials which are likely to vary. This need appears, for example, in the field of electric motor power supply circuits.

BRIEF SUMMARY

An embodiment provides a floating voltage source that enables maintaining a voltage between two output nodes, different potentials being capable of being alternately applied onto one of the nodes.

An embodiment provides a floating voltage source that enables maintaining a potential difference between two output nodes, one of the nodes being coupled to a reference potential via a capacitive element.

Thus, an embodiment provides a voltage source wherein at least one first switch couples a first node of the voltage source to a node of application of at least one potential of a power supply voltage, and at least one first capacitive element couples the first node or a second node of the voltage source to a control node of the first switch.

According to an embodiment, the voltage between the first node and the second node is maintained substantially constant during a variation of the potential applied to the second node.

According to an embodiment, the voltage source comprises means for maintaining substantially constant the voltage between the first node and the second node during a variation of the potential applied to the second node.

According to an embodiment, at least one auxiliary voltage source couples the control node of the first switch to the first node or the second node of the voltage source.

According to an embodiment, the auxiliary voltage source comprises at least one first resistive element coupling at least one first current source to the first node or to the second node of the voltage source, the first resistive element being coupled to the control node of the first switch.

According to an embodiment, at least one second resistive element couples the auxiliary voltage source and the control node of the first switch.

According to an embodiment, the first resistive element comprises at least one first MOS-type transistor having its gate coupled to its drain, the first switch comprising at least one second MOS-type transistor forming a current mirror with the first transistor.

According to an embodiment, the first current source comprises a first current mirror having a first branch coupled to a third node, and having a second branch coupled to a first branch of a second current mirror having its second branch coupled to the first node of the voltage source.

According to an embodiment, the auxiliary voltage source comprises a fourth resistive element coupling the gate of the first transistor to the first node of the voltage source; and a fifth resistive element couples the first branch of the first current mirror to the third node.

According to an embodiment, at least one second switch couples the control node of the first switch to the second node of the voltage source, and at least one second capacitive element couples the first node of the voltage source to a control node of the second switch.

According to an embodiment, at least one second current source is coupled to the control node of the first switch.

The foregoing and other features and advantages will be discussed in detail in the following non-limiting description of specific embodiments in connection with the accompanying drawings.

DETAILED DESCRIPTION

Figure 1:
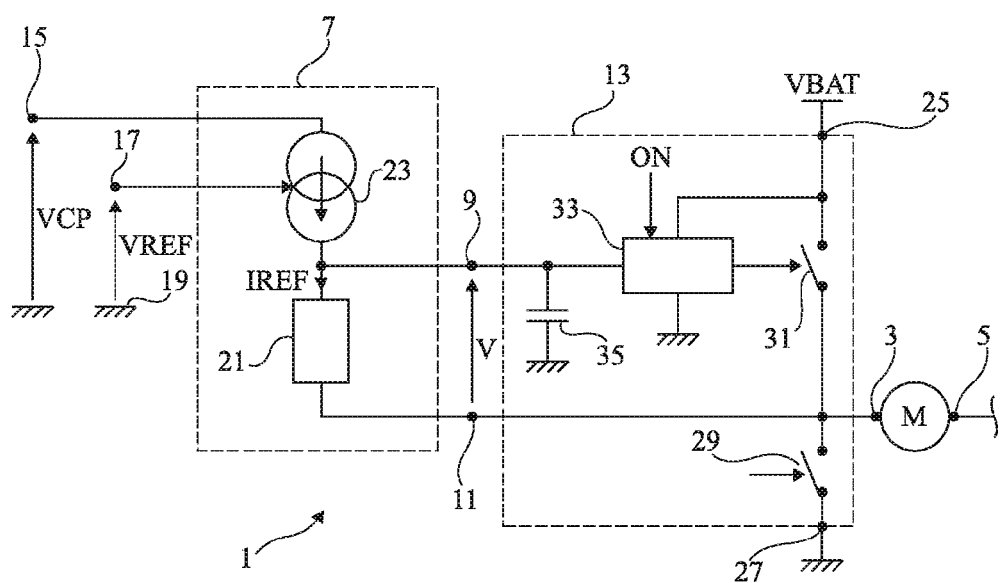
FIG. 1 schematically shows an example of an electronic device of the type to which the embodiments which will be described below apply.

The same elements have been designated with the same reference numerals in the different drawings. For clarity, only those elements which are useful to the understanding of the described embodiments have been shown and are detailed. In particular, only those elements of a control and power supply circuit which are useful to the understanding have been shown, this circuit further comprising other usual elements.

Unless otherwise specified, expressions "approximately", "substantially", and "in the order of" mean to within 10%, preferably to within 5%.

In the present description, the term "connected" designates a direct electrical connection between two elements, while the term "coupled" designates an electrical connection between two elements which may be direct or via one or a plurality of other passive or active components, such as resistors, capacitors, inductances, diodes, transistors, etc.

In the following description, voltage drops are neglected in series-connected elements (for example, switches in the on state) via which the different potentials are applied.

FIG. 1 schematically shows an example of a control and power supply device 1. Device 1 provides a potential on a first terminal 3 of a coil of a motor M. A second terminal 5 of the coil of motor M is connected to another identical control and power supply device, not shown. Device 1 comprises a floating voltage source 7 having two output nodes 9 and 11. Output nodes 9 and 11 are coupled to terminal 3 of the coil by a power supply circuit 13.

Floating voltage source 7 is powered with a power supply voltage VCP having a first potential applied to a node 15. A reference voltage VREF has a first potential applied to a node 17 of the floating voltage source. The second potential of power supply voltage VCP and the second potential of reference voltage VREF correspond to a reference potential, for example, a ground 19 having a zero potential by convention.

Floating current source 7 comprises a resistive element 21 coupling output nodes 9 and 11, and a current source 23, controlled by reference voltage VREF and coupling nodes 15 and 9. A reference current IREF is delivered by current source 23 according to reference voltage VREF so that a voltage V between output nodes 9 and 11 is equal to reference voltage VREF when the voltage sampled on node 9 by circuit 13 is zero.

Power supply circuit 13 is powered between a terminal 25 having a potential VBAT applied thereto and a terminal 27 connected to ground. Voltage VBAT corresponds to the motor power supply voltage. This voltage is for example provided by a battery, not shown.

Circuit 13 comprises:

a switch 29 coupling terminal 3 of the coil to ground, controlled by a circuit, not shown;

a switch 31, coupling terminal 25 of application of potential VBAT to terminal 3 of the coil;

a circuit 33 for controlling switch 31, coupled to terminal 25, to node 9, and to ground, the control circuit receiving a control signal ON; and a connection between output node 11 and terminal 3 of the coil.

Node 9 has undesired, through unavoidable, capacitive properties, which are symbolized by a parasitic capacitor 35 coupling node 9 to ground.

In operation, switches 29 and 31 alternately apply potential VBAT and the zero potential on terminal 3 of the coil to control the positioning or the rotation of the motor. The control of switch 29 is usual.

For switch 31, when control signal ON is activated, circuit 33 applies the potential of node 9 to the control node of switch 31, to control it in all or nothing. In the shown example, the current sampled on node 9 by circuit 33 is considered to be zero.

For each change of potential of node 3, the potential of output node 11 of voltage source 7 also varies. Parasitic capacitor 35 should then be charged or discharged, which requires significant currents. A disadvantage is that such significant currents cause variations of output voltage V of floating voltage source 7. Indeed, on application of potential VBAT to node 11, voltage V decreases, which may induce a delay in the rise of the potential powering the motor. Conversely, when node 11 is placed into contact with the ground, voltage V is capable of exceeding the maximum admissible values for the components of control circuit 33 or for switch 31. Thus, the variations of voltage V are desired to be limited when the potential applied to the output terminal is switched from one value to the other of voltage VBAT.

In the examples described hereafter, potential VCP is the highest of the device, and voltages VBAT and VREF are positive.

Figure 2:
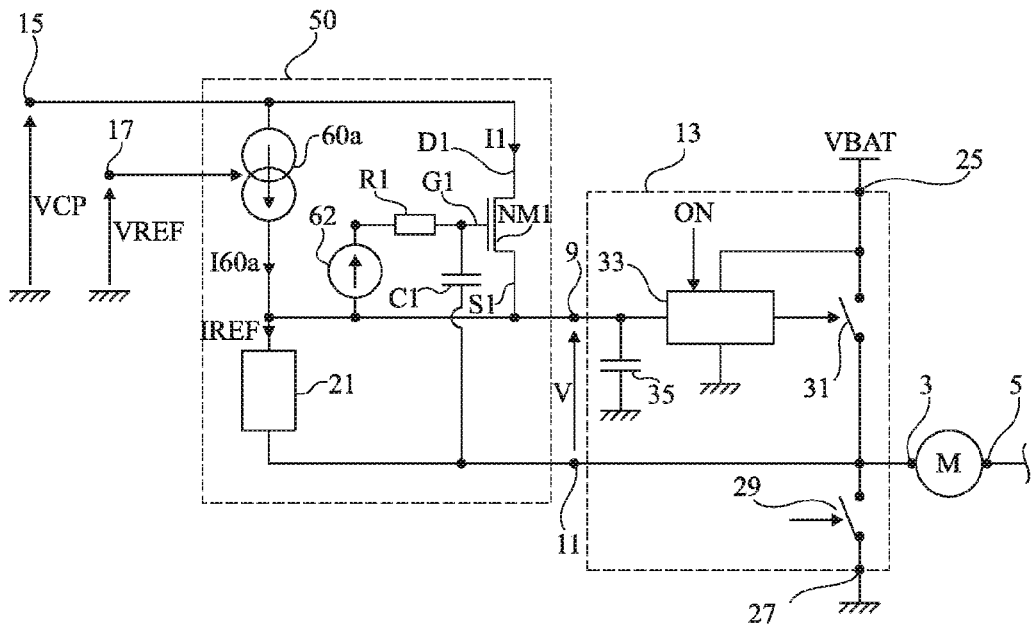
FIG. 2 schematically shows an embodiment of a floating voltage source.

FIG. 2 schematically shows an embodiment of a floating voltage source 50, capable of replacing source 7 of the device of FIG. 1.

Floating voltage source 50 comprises, as in FIG. 1, a current source 60a controlled by a reference voltage VREF and coupling a node 15 of application of a voltage VCP to an output node 9, and a resistive element 21 coupling node 9 to another output node 11.

An N-channel MOS-type transistor NM1 has its source S1 coupled to node 9 and its drain D1 coupled to node 15. Gate G1 or control node of transistor NM1 is coupled to node 11 by a capacitor C1 and to node 9 by an auxiliary voltage source 62 in series with a resistor R1. In the shown example, resistor R1 is connected to gate G1.

In steady state, auxiliary voltage source 62 maintains, through resistor R1, the state of charge of capacitor C1 so that transistor NM1 is preferably in a saturated state. A current I1 then flows through transistor NM1. Current source 60a outputs a current I60a, according to reference voltage VREF, so that the sum of currents I60a and I1 is equal to reference current IREF. Thus, voltage V between nodes 9 and 11 is substantially equal to reference voltage VREF.

In transient state, on application of potential VBAT to node 11 previously at the zero potential, capacitor C1 maintains the initial voltage between gate G1 and node 11. Thus, the voltage between gate G1 and source S1 of transistor NM1 increases, which causes a strong increase in the value of current I1, rapidly charging parasitic capacitor 35 from node 15 having voltage VCP applied thereto. Thereby, the potential of node 9 follows the increase of the potential of node 11, so that voltage V between nodes 9 and 11 remains substantially constant.

Figure 3:
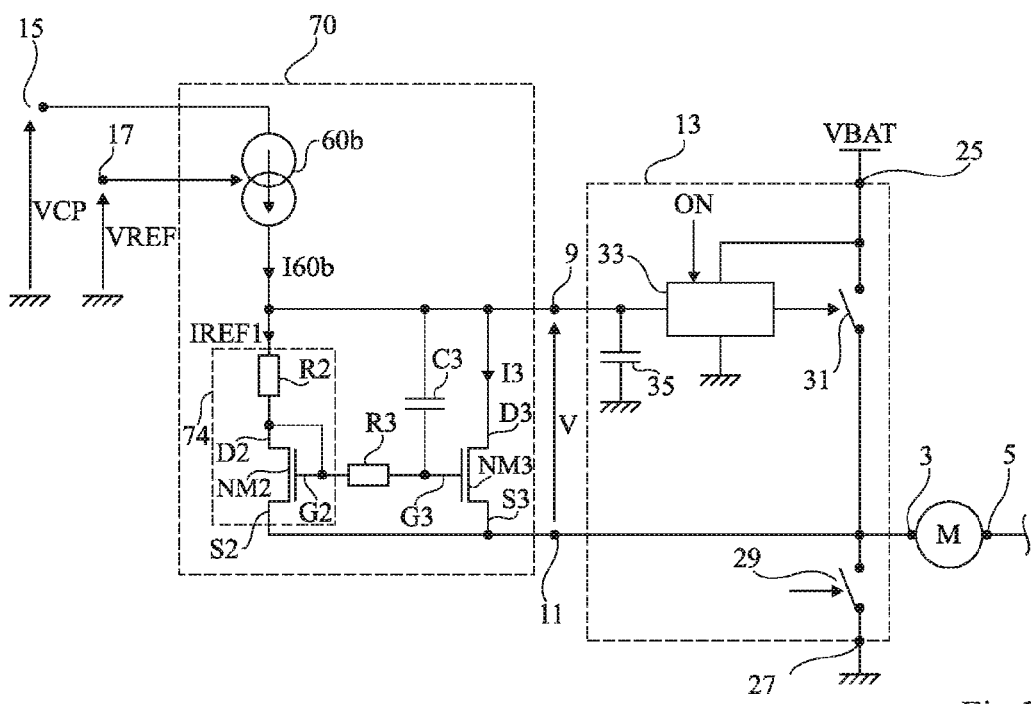
FIG. 3 schematically shows another embodiment of a floating voltage source.

FIG. 3 schematically shows another embodiment of a floating voltage source 70, capable of replacing source 7 of the device of FIG. 1.

Floating voltage source 70 comprises, as in FIG. 1, a current source 60b controlled by reference voltage VREF and coupling node 15 to node 9, and a resistive element 74 coupling output nodes 9 and 11. Resistive element 74 comprises a resistor R2 coupling node 9 to drain D2 of an N-channel MOS-type transistor NM2, having its gate G2 coupled to drain D2 and having its source S2 coupled to node 11.

An N-channel MOS-type transistor NM3 has its drain D3 coupled to node 9 and its source S3 coupled to node 11. Gate G3 of transistor NM3 is coupled on the one hand to node 9 by a capacitor C3, and on the other hand to gate G2 by a resistor R3.

In steady state, a reference current IREF1 flows through resistive element 74. Current IREF1 is adapted so that voltage V between nodes 9 and 11 is equal to reference voltage VREF. The flowing of current IREF1 through transistor NM2 induces a voltage between gate G2 and source S2. Thus, transistor NM2 forms a resistive element, and resistive element 74 forms an auxiliary voltage source maintaining the charge of capacitor C3 through resistor R3. When capacitor C3 is charged, transistors NM2 and NM3 form a current mirror and transistor NM3, preferably in a saturated state, conducts a current I3. Current source 60b delivers a current I60b equal to the sum of current I3 and of current IREF1.

In transient state, on application of the ground to node 11 previously at potential VBAT, capacitor C3 maintains the voltage between node 9 and gate G3. Thus, the voltage between gate G3 and source S3 of transistor NM3 increases, which causes a strong increase of current I3, thus discharging parasitic capacitor 35 towards node 11 having the ground applied thereto. Thus, the potential of node 9 follows the decrease of the potential of node 11, so that voltage V between nodes 9 and 11 remains substantially constant.

Figure 4:
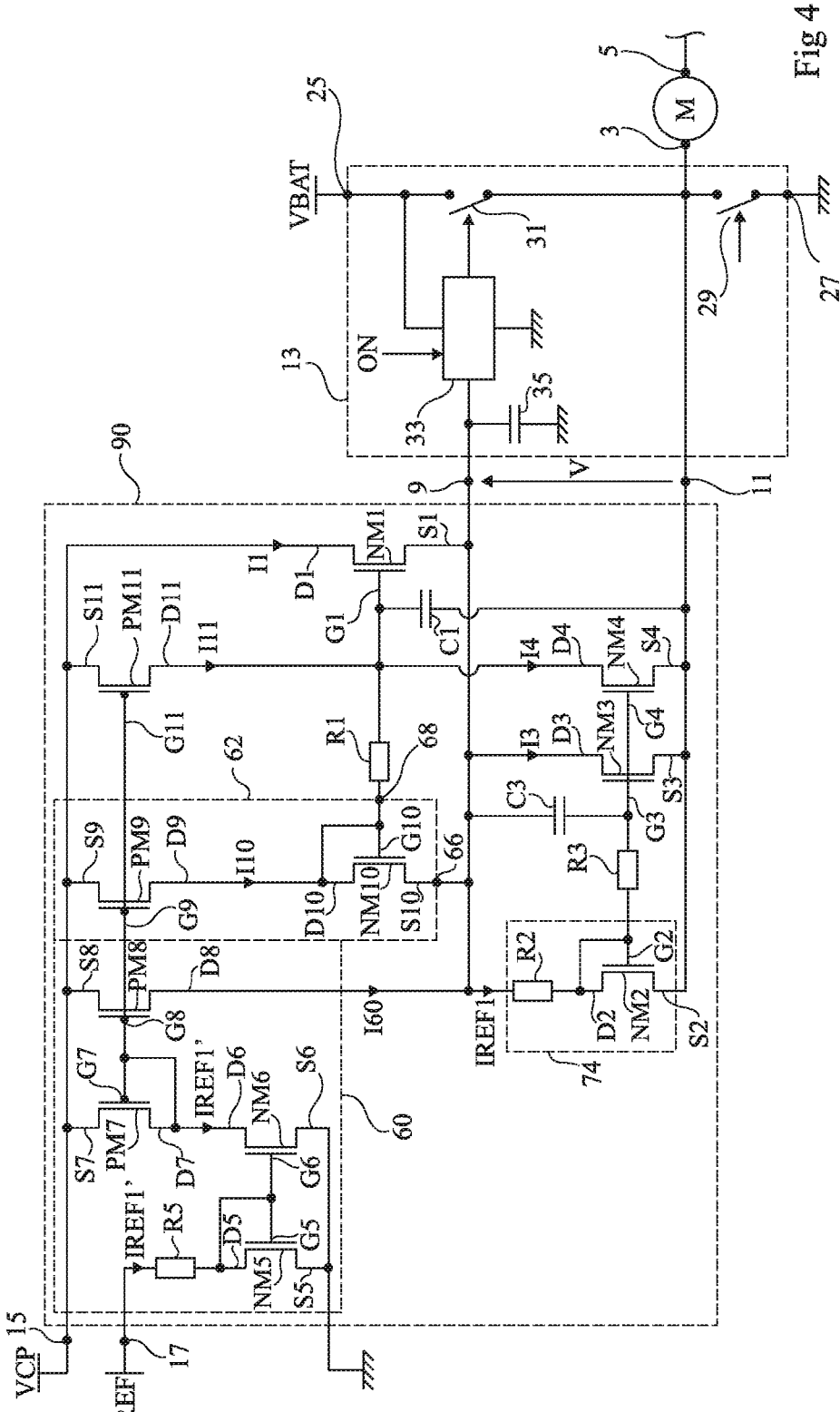
FIG. 4 schematically shows in further detail an embodiment of a floating voltage source combining the embodiments of FIGS. 2 and 3.

FIG. 4 schematically shows, in more detailed fashion, an embodiment of a floating voltage source 90 combining the embodiments of FIGS. 2 and 3. FIG. 4 shows an example of auxiliary voltage source 62 (FIG. 2), and an example of a current source 60 controlled by reference voltage VREF and coupling node 15 to node 9. Current source 60 provides an embodiment of current sources 60a and 60b (FIGS. 2 and 3). Floating voltage source 90 is capable of replacing source 7 of the device of FIG. 1.

Floating voltage source 90 comprises:

resistor R1, transistor NM1, capacitor C1, and auxiliary voltage source 62 such as described in relation with FIG. 2, auxiliary voltage source 62 having an input node 66 and an output node 68; and transistor NM3, capacitor C3, and resistor R3, as well as resistive element 74 comprising resistor R2 and transistor NM2, such as described in relation with FIG. 3.

The operation is similar to that described in relation with FIGS. 2 and 3, voltage V between output nodes 9 and 11 being maintained substantially constant during a change of the potential applied to node 11.

Floating voltage source 90 further comprises an N-channel MOS-type transistor NM4, having its source S4 coupled to node 11, having its gate G4 coupled to gate G3 of transistor NM3, and having its drain D4 coupled to gate G1 of transistor NM1.

When the ground is applied to node 11 prior to potential VBAT, capacitor C3 maintains the voltage between node 9 and gate G4. Thus, the voltage between gate G4 and source S4 of transistor NM4 increases, which causes an increase in current I4 flowing through transistor NM4. This increase discharges capacitor C1, which cancels current I1 flowing through transistor NM1. Thus, the discharge current of parasitic capacitor 35 is increased by the steady-state value of current I1, which contributes to maintaining the voltage between nodes 9 and 11 substantially equal to VREF when the potential of nodes 9 and 11 decreases.

Current source 60 comprises two N-channel MOS-type transistors NM5 and NM6 having their sources S5 and S6 coupled to ground, having their gates G5 and G6 coupled together and to drain D5 of transistor NM5, so that transistors NM5 and NM6 form a first current mirror. Drain D5 forms the first branch of the first current mirror and is coupled by a resistor R5 to node 17. Current source 60 further comprises a second current mirror comprising two P-channel MOS-type transistors PM7 and PM8 having their sources S7 and S8 coupled to node 15, and having their gates G7 and G8 coupled together and to drain D7 of transistor PM7. Drain D7 is coupled to drain D6 of transistor NM6 which forms a second branch of the first current mirror. Drain D8 of transistor PM8 delivers a current I60 and is coupled to output node 9.

In the disclosed example, on the one hand, resistor R5 of current source 60 and resistor R2 of resistive element 74 are identical and, on the other hand, transistors NM5 and NM2 are identical. Thereby, voltage V between output nodes 9 and 11 is equal to the reference voltage when current IREF1 flowing through resistive element 74 and a current IREF1' flowing through resistor R5 and transistor NM5 are equal. Transistor NM6 is for example such that a current equal to current IREF1' flows through transistors NM6 and PM7.

Auxiliary voltage source 62 comprises a transistor PM9, forming a current mirror with transistor PM7, gate G9 of transistor PM9 being coupled to gate G7 and its source S9 being coupled to node 15. Drain D9 of transistor PM9 is coupled to drain D10 of a transistor NM10 having its gate G10 coupled to drain D10 and to output node 68 of auxiliary voltage source 62. Source S10 of transistor NM10 is coupled to input node 66 of auxiliary voltage source 62. A current I10, output by transistor PM10 which thus forms a current source, flows through transistors PM9 and NM10, enabling to maintain a voltage between nodes 68 and 66, transistor NM10 thus forming a resistive element.

A P-channel MOS transistor PM11 forms a current mirror with transistor PM7, gate G11 of transistor PM11 being coupled to gate G7, and its source S11 being coupled to node 15. Transistor PM11 thus forms a current source. Drain D11 of transistor PM11 is connected to drain D4 of transistor NM4.

The transistors of voltage source 90 are such that:
current I4 flowing through transistor NM4 is compensated by a current I11 of same intensity crossing transistor PM11; and
the sum of currents I60, I10, and I1, minus current I3 flowing through transistor NM3, is equal to current IREF1.

In the above-described embodiments, on application of two successive potentials to output node 11 of the floating voltage source, the duration of the transient state is for example shorter than one microsecond. The time characteristic of the charge or of the discharge of capacitor C1 through resistor R1 and the time characteristic of the charge or of the discharge of capacitor C3 through resistor R3 are preferably longer than the duration of the transient state.

An advantage of a floating voltage source according to the above-described embodiments is that the output voltage remains substantially constant on variations of the potential applied to one of the output nodes.

Another advantage is that the output voltage remains substantially constant in the presence of a capacitive coupling between one of the output nodes and a reference potential.

Specific embodiments have been described. Various alterations, modifications, and improvements will occur to those skilled in the art. In particular, although the above-described examples of embodiments of the floating voltage source have been applied to a device 1 for powering a motor coil, similar embodiments may be included in other applications requiring a floating voltage source. In particular, the operation described in relation with FIGS. 2 to 4 remains identical for other positive or negative values of the potentials applied to output node 11.

Although MOS-type transistors have been used in the above-described embodiments, it will readily occur to those skilled in the art that other types of switches, for example, bipolar transistors, may be used.

Further, although capacitors C1, C3 have been described, it should be clear to those skilled in the art that other types of capacitive elements may be used. It should also be clear that other types of resistive elements, such as MOS-type transistors, may be used instead of above-described resistors R1, R2, R3, R5.

Further, although reference voltage VREF is positive in the examples described in relation with FIGS. 2 to 4, a negative reference voltage may be used, for example, by replacing N-type MOS transistors NM2 and MM3 with P-channel MOS transistors.

Further, similar embodiments, where:
N-channel MOS-type transistors are replaced with P-channel MOS type transistors;
P-channel MOS-type transistors are replaced with N-channel MOS type transistors; and
positive potentials are replaced with negative potentials of same absolute value, may be carried out.

Although the current sampled from terminal 9 of the floating voltage source by circuit 13 is considered zero in steady state, variations applied to devices where a current is sampled in steady state from terminal 9 are possible, for example by adjusting the values of the currents delivered by current sources 60, 60a, and 60b.

Further, although current sources 60a and 60 have been described in relation with respective FIGS. 2 and 4, it should be clear that such current sources may be omitted, for example by increasing current I1 by the value of respective currents I60a and I60.

Various embodiments with different variations have been described hereabove. It should be noted that those skilled in the art may combine various elements of these various embodiments and variations without showing any inventive step.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

Such alterations, modifications, and improvements are intended to be part of this disclosure, and are intended to be within the spirit and the scope of the present disclosure. Accordingly, the foregoing description is by way of example only and is not intended to be limiting.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A voltage source wherein at least one first switch couples a first node of the voltage source to a node of application of at least one potential of a power supply voltage, and at least one first capacitive element couples the first node or a second node of the voltage source to a control node of the at least one first switch, wherein the at least one first switch and the at least one first capacitive element are configured to maintain substantially constant a voltage between the first node and the second node in response to a variation of a potential applied to the second node.

2. The voltage source of claim 1, comprising means for maintaining substantially constant the voltage between the first node and the second node in response to a variation of the potential applied to the second node from a reference supply potential to a positive supply potential and in response to a variation of the potential applied to the second node from the positive supply potential to the reference supply potential.

3. The voltage source of claim 1, further comprising at least one auxiliary voltage source coupling the control node of the first switch to the first node or the second node of the voltage source.

4. The voltage source of claim 3, wherein the auxiliary voltage source comprises at least one first resistive element coupling at least one first current source to the first node or to the second node of the voltage source, the first resistive element being coupled to the control node of the first switch.

5. The voltage source of claim 4, further comprising at least one second resistive element coupling the auxiliary voltage source and the control node of the first switch.

6. The voltage source of claim 4, wherein the first resistive element comprises at least one first MOS-type transistor having its gate coupled to the drain, the first switch comprising at least one second MOS-type transistor forming a current mirror with the first transistor.

7. The voltage source of claim 4, wherein the first current source comprises a first current mirror having a first branch coupled to a third node, and having a second branch coupled to a first branch of a second current mirror having its second branch coupled to the first node of the voltage source.

8. The voltage source of claim 7, wherein:
the auxiliary voltage source comprises a fourth resistive element coupling the gate of the first transistor to the first node of the voltage source; and
a fifth resistive element couples the first branch of the first current mirror to the third node.

9. The voltage source of claim 1, wherein at least one second switch couples the control node of the first switch to the second node of the voltage source, and at least one second capacitive element couples the first node of the voltage source to a control node of the second switch.

10. The voltage source of claim 9, wherein at least one second current source is coupled to the control node of the first switch.

11. A floating gate voltage source, comprising:
a first switch circuit having a first control node and being configured to couple a first output node of the voltage source to a supply voltage source; and
a first capacitive circuit coupled between the first control node and a second output node of the voltage source, the second output node configured to be coupled to a terminal of a load coil and the first capacitive circuit configured to control a voltage on the first control node of the first switch circuit responsive to a change in a voltage on the second output node from a first level to a second level to drive the first switch circuit to maintain a reference voltage across the first and second output nodes.

12. The floating gate voltage source of claim 11 further comprising:
a second switch circuit having a second control node and being configured to couple the first output node of the voltage source to the second output node; and
a second capacitive circuit coupled between the second control node and the first output node of the voltage source, the second capacitive circuit configured to control a voltage on the second control node of the second switch circuit responsive to a change in a voltage on the second output node from the second level to the first level to drive the second switch circuit to maintain the reference voltage across the first and second output nodes.

13. The floating gate voltage source of claim 12 further comprising a power supply circuit that includes a half-bridge circuit including a first switch coupled between the second output node a supply voltage source and a second switch coupled between the second output node a reference voltage source, the supply voltage source corresponding the first level and the reference voltage corresponding to the second level on the second output node.

14. A method, comprising:
coupling a power supply voltage to a first output node through a first switch having a first control node;
coupling a drive voltage having a first level or a second level to a second output node, the second output node configured to be coupled to a terminal of a load coil; and
capacitively coupling the voltage on the second output node to the first control node to generate a first control voltage on the first control node of the first switch responsive to a change in the voltage on the second output node from the first level to the second level to drive the first switch to maintain a reference voltage across the first and second output nodes.

15. The method of claim 14 further comprising:
coupling the first output node of the voltage source to the second output node through a second switch having a second control node; and
capacitively coupling the voltage on the first output node to the second control node to generate a second control voltage on the second control node of the second switch responsive to a change in the voltage on the second output node from the second level to the first level to drive the second switch to maintain the reference voltage across the first and second output nodes.

16. The method of claim 15, further comprising providing a first resistive element across the first and second output nodes.

17. The method of claim 16, further comprising:
generating a first auxiliary voltage having a value that is a function of a current through the first resistive element; and
coupling the first auxiliary voltage to the control node of the second switch.

18. The method of claim 17, further comprising providing a second resistive element across the first output node and a node that receives the power supply voltage.

19. The method of claim 18, further comprising:
generating a second auxiliary voltage having a value that is a function of a current through the second resistive element; and
coupling the second auxiliary voltage to the control node of the first switch.

* * * * *